(12) United States Patent
Weng

(10) Patent No.: US 11,487,925 B1
(45) Date of Patent: Nov. 1, 2022

(54) SIMULATION METHOD, APPARATUS, AND DEVICE, AND STORAGE MEDIUM

(71) Applicant: CHANGXIN MEMORY TECHNOLOGIES, INC., Hefei (CN)

(72) Inventor: Kun Weng, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/664,677

(22) Filed: May 24, 2022

Related U.S. Application Data

(63) Continuation of application No. PCT/CN2021/122420, filed on Sep. 30, 2021.

(30) Foreign Application Priority Data

Jul. 2, 2021 (CN) .......................... 202110753690.8

(51) Int. Cl.
*G06F 30/3308* (2020.01)
*G06F 30/333* (2020.01)
(Continued)

(52) U.S. Cl.
CPC ........ *G06F 30/3308* (2020.01); *G06F 30/333* (2020.01); *G06F 30/367* (2020.01); *G06F 30/398* (2020.01); *G06F 2119/16* (2020.01)

(58) Field of Classification Search
CPC .. G06F 30/3308; G06F 30/333; G06F 30/367; G06F 30/398; G06F 2119/16
(Continued)

(56) References Cited

U.S. PATENT DOCUMENTS 5,608,668 A * 3/1997 Zagar .................. G11C 7/14
  365/210.1
5,757,710 A * 5/1998 Li ...................... G11C 11/4091
  365/205
(Continued)

FOREIGN PATENT DOCUMENTS

CN 103093016 A 5/2013
CN 102339341 B 7/2013
(Continued)

OTHER PUBLICATIONS

Dong, "Modeling and Leveraging Emerging Non-Volatile Memories for Future Computer Designs", The Pennsylvania State University, The Graduate School College of Engineering, 2011, 134 pages. (Year: 2011).*

*Primary Examiner* — Phallaka Kik
(74) *Attorney, Agent, or Firm* — Cooper Legal Group, LLC

(57) ABSTRACT

A simulation method, apparatus, and a storage medium are provided. The simulation method includes: obtaining a pre-built local simulation model of a capacitor array region, wherein the local simulation model is configured to represent first simulation parameters of the capacitor array region; creating a local parameter netlist of a non-capacitor array region, wherein the local parameter netlist includes second simulation parameters of the non-capacitor array region; creating an overall parameter netlist of a peripheral region based on the local simulation model and the local parameter netlist, wherein the overall parameter netlist represents overall simulation parameters of the peripheral region, and the overall simulation parameters include the first simulation parameters and the second simulation parameters; and performing simulation on the peripheral region based on the overall parameter netlist.

16 Claims, 6 Drawing Sheets

(51) Int. Cl.
*G06F 30/367* (2020.01)
*G06F 30/398* (2020.01)
*G06F 119/16* (2020.01)

(58) Field of Classification Search
USPC .............. 716/106, 111, 136; 703/14, 15
See application file for complete search history.

(56) References Cited

U.S. PATENT DOCUMENTS

| | | | |
|---|---|---|---|
| 5,819,065 A | 10/1998 | Chilton et al. | |
| 6,026,230 A * | 2/2000 | Lin ........................ | G06F 30/33 703/13 |
| 6,539,536 B1 * | 3/2003 | Singh ..................... | G06F 30/30 716/132 |
| 6,678,644 B1 * | 1/2004 | Segal ..................... | G06F 30/398 716/108 |
| 6,810,442 B1 * | 10/2004 | Lin ........................ | G06F 30/33 710/52 |
| 6,845,489 B1 * | 1/2005 | Mizuno .................. | G06F 30/30 716/132 |
| 6,954,915 B2 * | 10/2005 | Batchelor ............. | G06F 30/3312 716/113 |
| 2003/0149962 A1 * | 8/2003 | Willis .................... | G06F 30/367 712/15 |
| 2003/0154061 A1 * | 8/2003 | Willis .................... | G06F 30/367 703/4 |
| 2004/0057292 A1 * | 3/2004 | Lachenmann ..... | H01L 27/10867 257/E21.653 |
| 2004/0173876 A1 * | 9/2004 | Musalem ................ | H01G 5/18 257/595 |
| 2016/0034622 A1 * | 2/2016 | Sarkar ................... | G06F 30/367 703/14 |

FOREIGN PATENT DOCUMENTS

| | | |
|---|---|---|
| CN | 107729586 A | 2/2018 |
| CN | 112560368 A | 3/2021 |

* cited by examiner

SIMULATION METHOD, APPARATUS, AND DEVICE, AND STORAGE MEDIUM

CROSS-REFERENCE TO RELATED APPLICATIONS

This is a continuation of International Application No. PCT/CN2021/122420, filed on Sep. 30, 2021, which is based on and claims the priority to Chinese Patent Application No. 202110753690.8, titled "SIMULATION METHOD, APPARATUS, AND DEVICE, AND STORAGE MEDIUM" and filed on Jul. 2, 2021. The entire contents of International Application No. PCT/CN2021/122420 and Chinese Patent Application No. 202110753690.8 are incorporated herein by reference.

BACKGROUND

A memory structure (such as a dynamic random access memory (DRAM)) is an essential component in a modern electronic system. The memory structure is provided with many cell capacitors. Cell capacitors in a same row are coupled to a same word line structure. Cell capacitors in a same column are coupled to a same bit line structure. Performance of the cell capacitors is critical to performance of the formed memory structure.

Currently, pre-circuit simulation and post-layout simulation need to be performed on a designed memory structure, to ensure performance parameters of the formed memory structure.

SUMMARY

Embodiments of the present disclosure relate to, but are not limited to, a simulation method, apparatus, and device, and a storage medium.

An overview of the subject matter detailed in the present disclosure is provided below, which is not intended to limit the protection scope of the claims.

The present disclosure provides a simulation method, apparatus, and device, and a storage medium.

According to a first aspect of embodiments of the present disclosure, a simulation method is provided, applied to a peripheral region of a memory structure, wherein the peripheral region includes a capacitor array region and a non-capacitor array region, and the simulation method includes:

obtaining a pre-built local simulation model of the capacitor array region, wherein the local simulation model is configured to represent first simulation parameters of the capacitor array region;

creating a local parameter netlist of the non-capacitor array region, wherein the local parameter netlist includes second simulation parameters of the non-capacitor array region;

creating an overall parameter netlist of the peripheral region based on the local simulation model and the local parameter netlist, wherein the overall parameter netlist represents overall simulation parameters of the peripheral region, and the overall simulation parameters include the first simulation parameters and the second simulation parameters; and performing simulation on the peripheral region based on the overall parameter netlist.

According to a second aspect of the embodiments of the present disclosure, a simulation apparatus is provided, applied to a peripheral region of a memory structure, wherein the peripheral region includes a capacitor array region and a non-capacitor array region, and the simulation apparatus includes:

one or more processors; and a storage apparatus, configured to store one or more programs, wherein the one or more programs, when executed by the one or more processors, cause the one or more processors to execute operations of:

obtaining a pre-built local simulation model of the capacitor array region, wherein the local simulation model is configured to represent first simulation parameters of the capacitor array region;

creating a local parameter netlist of the non-capacitor array region, wherein the local parameter netlist includes second simulation parameters of the non-capacitor array region; and creating an overall parameter netlist of the peripheral region based on the local simulation model and the local parameter netlist, wherein the overall parameter netlist represents overall simulation parameters of the peripheral region, and the overall simulation parameters include the first simulation parameters and the second simulation parameters; and performing simulation on the peripheral region based on the overall parameter netlist.

According to a third aspect of the embodiments of the present disclosure, a non-transitory computer-readable storage medium is provided, wherein when executed by a processor of a simulation device, instructions in the storage medium enable the simulation device to perform the simulation method as described in the first aspect.

Other aspects of the present disclosure are understandable upon reading and understanding of the accompanying drawings and detailed description.

BRIEF DESCRIPTION OF THE DRAWINGS

The accompanying drawings incorporated into the specification and constituting part of the specification illustrate the embodiments of the present disclosure, and are used together with the description to explain the principles of the embodiments of the present disclosure. In these accompanying drawings, similar reference numerals are used to represent similar elements. The accompanying drawings in the following description are part rather than all of the embodiments of the present disclosure. Those skilled in the art may derive other drawings based on these drawings without creative efforts.

DETAILED DESCRIPTION

The technical solutions in the embodiments of the present disclosure are described below clearly and completely with reference to the drawings in the embodiments of the present disclosure. Apparently, the described embodiments are merely part rather than all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

Figure 1:
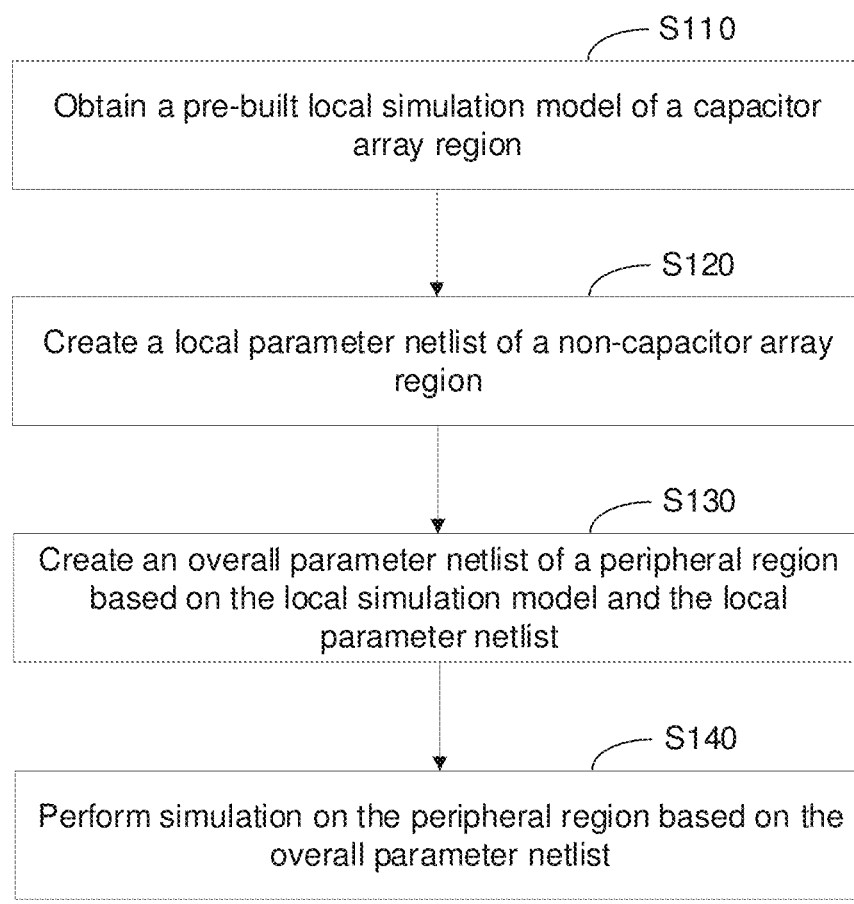
FIG. 1 is a flowchart of a simulation method according to an exemplary embodiment.
Figure 1A:
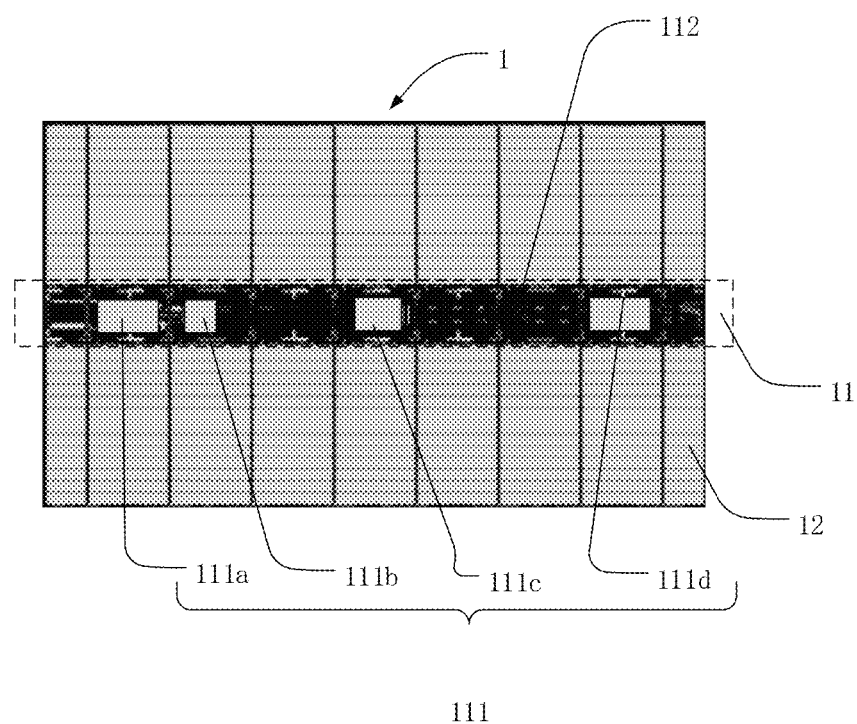
FIG. 1A is a schematic diagram of a memory structure according to an example.

Referring to FIG. 1A, a memory structure 1 (such as a double data rate (DDR) synchronous dynamic random-access memory (SDRAM), or another memory structure (DRAM), wherein the another memory structure is, for example, an SDRAM) generally includes a peripheral region 11 and a memory region 12. In FIG. 1A, a region enclosed by a dashed box is the peripheral region 11. The actual memory structure 1 does not include the dashed box in FIG. 1A. The dashed box herein serves only to distinguish between the peripheral region 11 and the memory region 12.

The memory region 12 generally includes a capacitor array, and for implementing a storage function (including read and write). The peripheral region 11 is used for signal processing, to assist the memory region 12 in implementing the storage function. During simulation of the peripheral region 11, a parameter netlist of the entire peripheral region 11 generally needs to be directly created. The creation of the parameter netlist relates to extraction of parasitic parameters of the entire peripheral region 11.

The peripheral region 11 generally includes a capacitor array region 111 consisting of capacitor cells, and a non-capacitor array region 112 consisting of processing circuits. The capacitor array region 111 may include at least one capacitor array subregion. For example, referring to FIG. 1A, the capacitor array region 111 includes four capacitor array subregions: a capacitor array subregion 111a, a capacitor array subregion 111b, a capacitor array subregion 111c, and a capacitor array subregion 111d.

In a process of extracting the parasitic parameters of the capacitor array region 111 by using a parasitic parameter extraction program, it usually needs to take a lot of time to analyze topology structures of capacitor arrays in the capacitor array region 111, which occupies a large amount of physical memory of a parasitic parameter extraction apparatus, resulting in a slower overall operation and affecting subsequent simulation.

However, the layout of the capacitor array region 111 is generally regular, and in different memory structures 1, the layout of the capacitor array region 111 is generally unchanged or slightly changed.

In view of this, the present disclosure provides a simulation method. The simulation method is applied to a peripheral region of a memory structure. The peripheral region includes a capacitor array region and a non-capacitor array region. In the simulation method, a local simulation model of the capacitor array region is pre-built. As a result, there is no need to create a parameter netlist for the capacitor array region. Instead, a local parameter netlist of the non-capacitor array region is directly created. Then, an overall parameter netlist of the entire peripheral region is created based on the local simulation model and the local parameter netlist, to perform simulation on the peripheral region.

According to the simulation method, there is no need to create a parameter netlist of a capacitor array region and there is no need to extract a parasitic parameter of the capacitor array region, such that a duration for creating an overall parameter netlist can be reduced, and thus a duration of the entire simulation process is reduced, thereby improving simulation efficiency. In addition, because the layout of the capacitor array region is generally relatively regular, it is also easy to build a local simulation model in advance, and reliability of the local simulation model is also favorable. Accuracy of a finally obtained overall parameter netlist is also high, and a simulation effect is favorable.

Referring to FIG. 1, the simulation method provided in this embodiment of the present disclosure includes:

S110. Obtain a pre-built local simulation model of the capacitor array region.

S120. Create a local parameter netlist of the non-capacitor array region.

S130. Create an overall parameter netlist of the peripheral region based on the local simulation model and the local parameter netlist.

S140. Perform simulation on the peripheral region based on the overall parameter netlist.

Figure 1B:
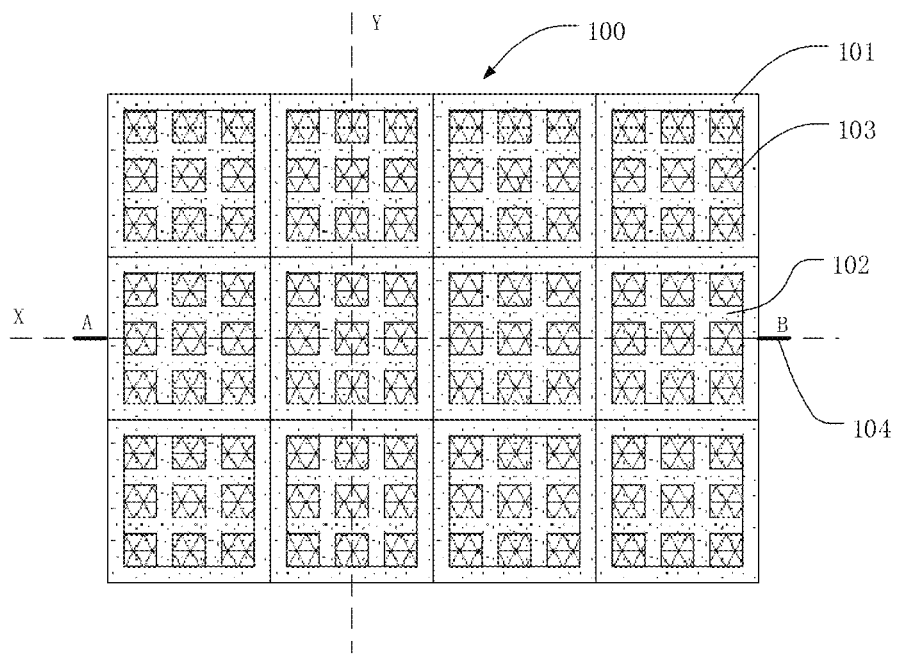
FIG. 1B is a schematic diagram of a capacitor array region according to an example.
Figure 1C:
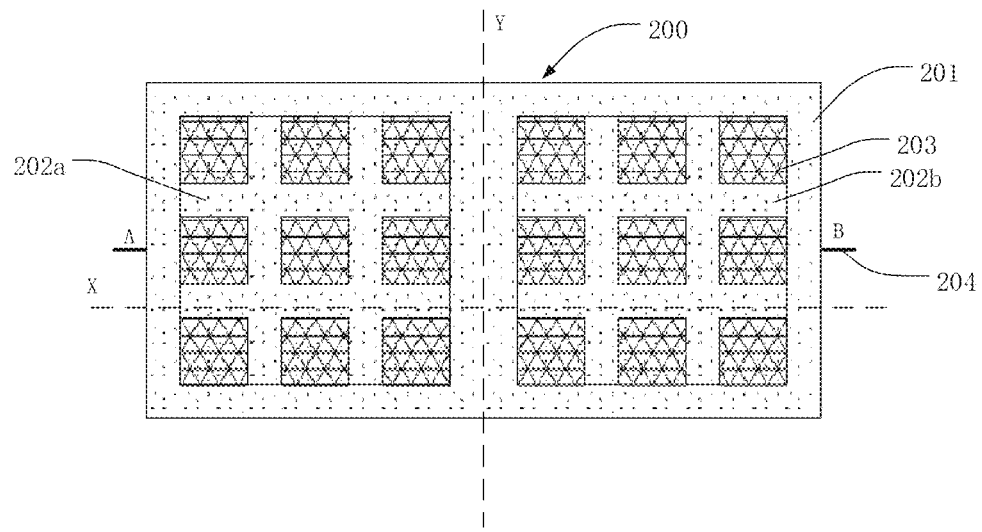
FIG. 1C is a schematic diagram of a capacitor simulation model according to an example.
Figure 1D:
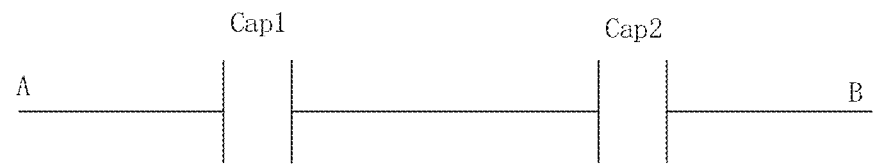
FIG. 1D is a schematic diagram of a capacitor array region according to an example.
Figure 1E:
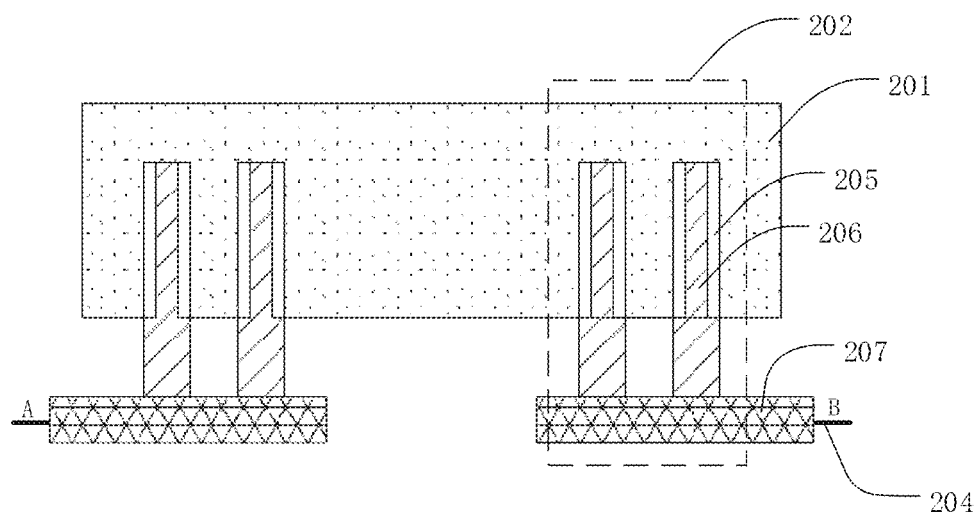
FIG. 1E is a schematic diagram of a capacitor array region according to an example.
Figure 1F:
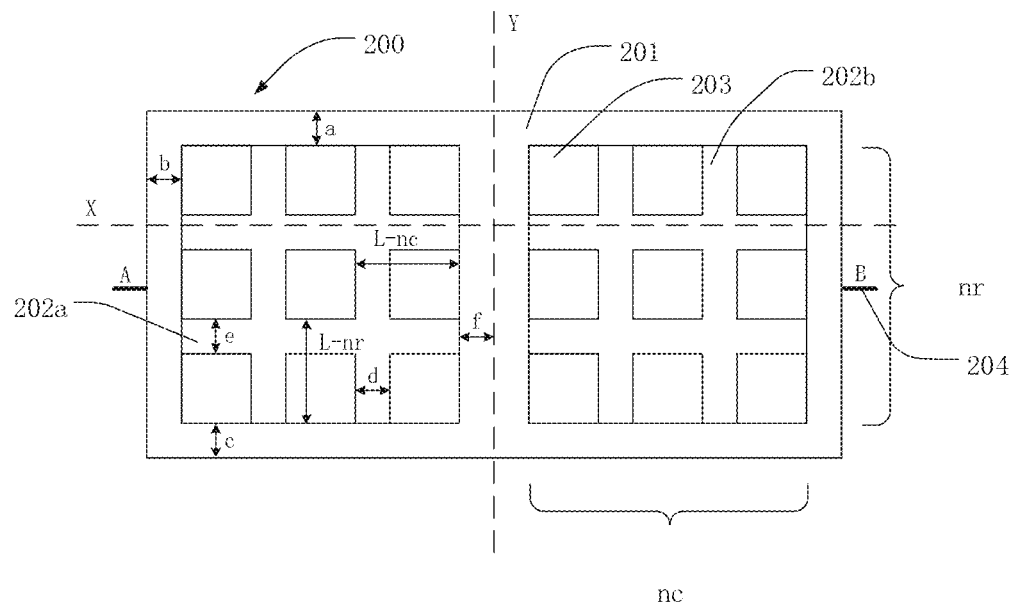
FIG. 1F is a schematic diagram of an initial simulation model according to an example.
Figure 1G:
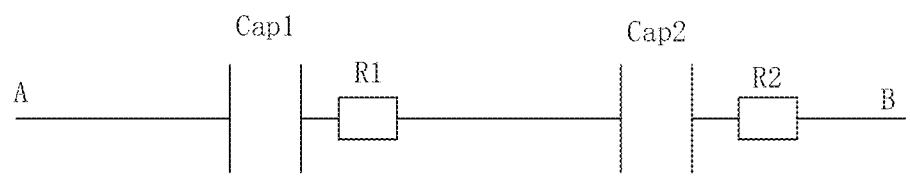
FIG. 1G is a schematic diagram of a local simulation model according to an example.
Figure 1H:
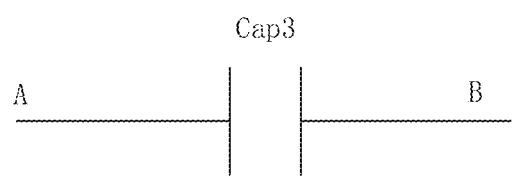
FIG. 1H is a schematic diagram of a capacitor array region according to an example.
Figure 1I:
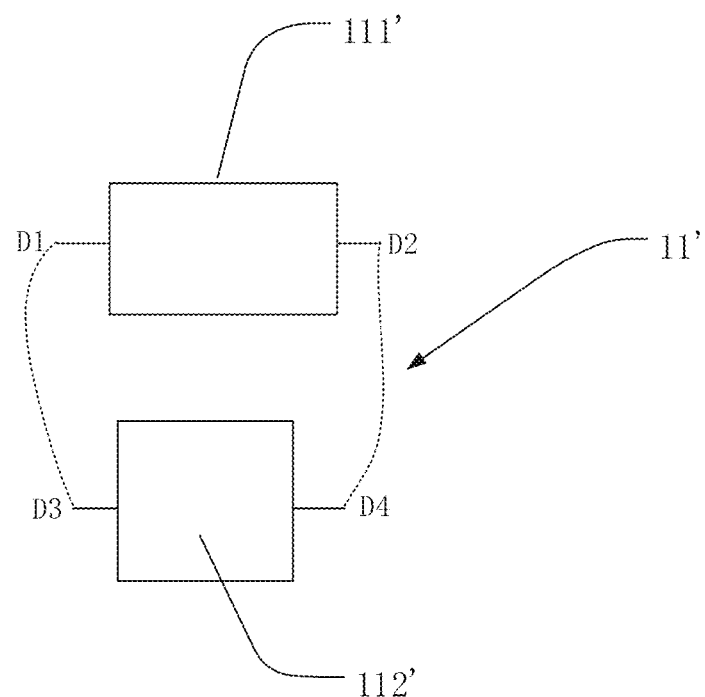
FIG. 1I is a schematic connection diagram of a local simulation model and a local parameter netlist according to an example.

In step S101, referring to FIG. 1A and FIG. 1I, a simulation model of the capacitor array region 111 is denoted as a local simulation model 111'. Simulation parameters of the capacitor array region 111 are denoted as first simulation parameters. A theoretical parameter (also referred to as an ideal parameter, that is, a parameter designed for the capacitor array region) of the capacitor array region 111 is denoted as a first theoretical parameter. A parasitic parameter of the capacitor array region 111 is denoted as a first parasitic parameter.

The local simulation model 111' is configured to represent the first simulation parameters. The first simulation parameters may include the first theoretical parameter and the first parasitic parameter. The first theoretical parameter may include a theoretical capacitance (also referred to as an ideal capacitance) of the capacitor array region 111. The first parasitic parameter may include a parasitic resistance, a parasitic capacitance, or the like of the capacitor array region 111.

Because the layout of the capacitor array region 111 is relatively regular, the local simulation model 111' can be built according to capacitor components in the capacitor array region 111 and a manner in which the capacitor components are arranged.

It should be noted that, the local simulation model and the local parameter netlist are each a set of data, and FIG. 1I is merely a schematic diagram of the local simulation model and the local parameter netlist for ease of understanding.

In step S120, referring to FIG. 1A and FIG. 1I, a parameter netlist of the non-capacitor array region 112 is denoted as a local parameter netlist 112'. Simulation parameters of the non-capacitor array region 112 are denoted as second simulation parameters. A theoretical parameter of the non-capacitor array region 112 is denoted as a second theoretical parameter. A parasitic parameter of the non-capacitor array region 112 is denoted as a second parasitic parameter.

The local parameter netlist 112' includes the second simulation parameters. The second simulation parameters may include the second theoretical parameter and the second parasitic parameter. The second theoretical parameter may include a theoretical capacitance, a theoretical resistance (also referred to as an ideal resistance), and the like of the non-capacitor array region 112. The second theoretical parameter may be determined based on a design of the non-capacitor array region 112. The second parasitic parameters may include a parasitic capacitance, a parasitic resistance, or the like of the non-capacitor array region 112. The second parasitic parameter may be extracted by using a parasitic parameter extraction program.

In step S130, referring to FIG. 1I, a connection may be established between the local simulation model 111' and the local parameter netlist 112', to combine the local simulation model 111' and the local parameter netlist 112', to form a parameter netlist of the peripheral region 11. The parameter netlist of the peripheral region 11 is denoted as an overall parameter netlist 11'.

The overall parameter netlist 11' represents overall simulation parameters of the peripheral region 11, and the overall simulation parameters include the first simulation parameter and the second simulation parameter. That is, the overall parameter netlist 11' represents the simulation parameters of the capacitor array region 111 and the simulation parameters of the non-capacitor array region 112, to facilitate subsequent reliable simulation.

In step S140, referring to FIG. 1A and FIG. 1I, simulation may be performed on the peripheral region 11 by using the overall parameter netlist 11' as the parameter netlist of the peripheral region 11, to complete post-layout simulation of the peripheral region 11.

In this simulation method, a local simulation model for representing the first simulation parameter of the capacitor array region is pre-built based on characteristics of the capacitor array region. Only the parasitic parameter of the non-capacitor array region is extracted, and then the local parameter netlist of the non-capacitor array region is created with reference to the second theoretical parameter of the non-capacitor array region. Finally, the local simulation model and the local parameter netlist are combined to obtain the overall parameter netlist. This not only can ensure a favorable simulation effect, but also can greatly reduce a duration for creating the overall parameter netlist, thus reducing a duration of the entire simulation process, thereby improving simulation efficiency.

In an exemplary embodiment, a simulation method is provided. In this simulation method, the creating a local parameter netlist of the non-capacitor array region includes:

S210. Construct a local theoretical parameter netlist.

S220. Extract a second parasitic parameter of the peripheral region based on a parasitic parameter extraction program, and create a local parasitic parameter netlist.

S230. Create the local parameter netlist based on the local theoretical parameter netlist and the local parasitic parameter netlist.

In step S210, referring to FIG. 1A and FIG. 1I, a theoretical parameter of the non-capacitor array region 112 is denoted as a second theoretical parameter. A theoretical parameter netlist of the non-capacitor array region 112 is denoted as a local theoretical parameter netlist. The local theoretical parameter netlist includes the second theoretical parameter. The second theoretical parameter may be determined based on design information of the non-capacitor array region 112.

In step S220, referring to FIG. 1A and FIG. 1I, a parasitic parameter of the non-capacitor array region 112 is denoted as a second parasitic parameter. A parasitic parameter netlist of the non-capacitor array region 112 is denoted as a local parasitic parameter netlist.

In this step, the second parasitic parameter may be extracted by using a parasitic parameter extraction program. For example, an electronic design automation (EDA) tool (wherein the EDA tool is provided with the parasitic parameter extraction program) is configured to extract the second parasitic parameter of the peripheral region 11. The second parasitic parameter of the peripheral region 11 is the parasitic parameter of the non-capacitor array region 112.

In this step, the parasitic parameter netlist of the non-capacitor array region 112 can be created based on the parasitic parameter of the non-capacitor array region 112 after the parasitic parameter of the non-capacitor array region 112 is obtained by using the parasitic parameter extraction program.

In step S230, referring to FIG. 1A and FIG. 1I, a connection may be established between the local theoretical parameter netlist and the local parasitic parameter netlist, to combine the local theoretical parameter netlist and the local parasitic parameter netlist, to obtain a local parameter netlist 112'. In other words, the theoretical parameter netlist and the parasitic parameter netlist of the non-capacitor array region 112 are combined, to obtain the parameter netlist of the non-capacitor array region 112. The parameter netlist of the non-capacitor array region 112 includes the theoretical parameter and the parasitic parameter of the non-capacitor array region 112, to facilitate subsequent simulation.

In this simulation method, the local theoretical parameter netlist is constructed based on design information of the non-capacitor array region. In addition, the local parasitic parameter netlist is created by using the parasitic parameter extraction program. Then, the local parameter netlist is created based on the local theoretical parameter netlist and the local parasitic parameter netlist, such that a local parameter netlist with high accuracy can be obtained, thereby improving reliability of subsequent simulation.

In an exemplary embodiment, a simulation method is provided. In this simulation method, the extracting a second parasitic parameter of the peripheral region based on a parasitic parameter extraction program, and creating a local parasitic parameter netlist includes:

S310. During the extraction of the second parasitic parameter, skip a preset step in the parasitic parameter extraction program.

The preset step is a verification step for the capacitor array region 111.

In other words, referring to FIG. 1A, in this simulation method, during the extraction of the parasitic parameter by using the parasitic parameter extraction program, the verification step for the capacitor array region 111 is skipped, without verification and analysis of the capacitor array region 111, and only the parasitic parameter (that is, the second parasitic parameter) of the non-capacitor array region 112 is extracted. In this simulation method, the parasitic parameter extraction program can be prevented from processing an unnecessary region, such that a speed for extracting the parasitic parameter can be increased, thereby increasing a speed of the entire simulation process and improving simulation efficiency.

It should be noted that, referring to FIG. 1A and FIG. 1I, during the extraction of the parasitic parameter by using the parasitic parameter extraction program, the entire peripheral region 11 needs to access the EDA tool. Because the simulation model (that is, the local simulation model 111') of the capacitor array region 111 is pre-built, there is no need to extract the parasitic parameter of the capacitor array region 111 by using the parasitic parameter extraction program, and there is no need to verify the capacitor array region 111. Therefore, during operation of the parasitic parameter extraction program, a step (that is, a preset step) related to the capacitor array region 111 may be skipped, and the parasitic parameter of the non-capacitor array region 112 is directly extracted. In this way, accuracy of the extraction of the second parasitic parameter is not affected, and a speed for extracting the second parasitic parameter is increased.

In an exemplary embodiment, a simulation method is provided. Referring to FIG. 1I, in this simulation method, the local simulation model 111' includes a first port D1 related to the capacitor array region 111 and a second port D2 related to the non-capacitor array region 112. The local parameter netlist 112 includes a third port D3 related to the capacitor array region 111 and a fourth port D4 related to the non-capacitor array region 112.

It should be noted that, the local simulation model and the local parameter netlist are each a set of data, the first port, the second port, the third port, and the fourth port are each merely a virtual port, and FIG. 1I is merely a schematic connection diagram of a local simulation model and a local parameter netlist for ease of understanding.

In this method, the creating an overall parameter netlist of the peripheral region based on the local simulation model and the local parameter netlist includes:

S410. Create the overall parameter netlist by calling the first port, the second port, the third port, and the fourth port.

Referring to FIG. 1A and FIG. 1I, the first port D1 and the third port D3 are both related to the capacitor array region 111, and during calling of the first port D1 and the third port D3, the first port D1 of the local simulation model 111' is connected to the third port D3 of the local parameter netlist 112'. The second port D2 and the fourth port D4 are both related to the non-capacitor array region 112, and during calling of the second port D2 and the fourth port D4, the second port D2 of the local simulation model 111' is connected to the fourth port D4 of the local parameter netlist 112'. In this way, the local simulation model 111' and the local parameter netlist 112' can be combined to create the overall parameter netlist 111'.

In this simulation method, the first port related to the capacitor array region and the second port related to the non-capacitor array region are reserved in the local simulation model, and the third port related to the capacitor array region and the fourth port related to the non-capacitor array region are reserved in the local parameter netlist. In this way, correctness of a connection relationship of the overall parameter netlist can be ensured, such that the connection relationship of the overall parameter netlist is the same as a connection relationship of circuits in the peripheral region, thereby ensuring reliability of the overall parameter netlist, and better ensuring reliability of a subsequent simulation model.

In an exemplary embodiment, a simulation method is provided. In this simulation method, the capacitor array region includes a plurality of preset capacitor cells. The preset capacitor cells each include a plurality of cell capacitors (such as capacitor components). The first theoretical parameter includes a first theoretical capacitance of each preset capacitor cell, and the first parasitic parameter includes a parasitic resistance of each preset capacitor cell.

Example 1

Referring to FIG. 1B, cell capacitors 103 may be distributed in a matrix, and specifically, may be distributed in a matrix array of three columns and three rows, to form a preset capacitor cell 102. The preset capacitor cell 102 couples the cell capacitors 103 as a whole through a conductive layer 101.

Alternatively, preset capacitor cells 102 may be distributed in a matrix, and specifically, may be distributed in a matrix array of four columns and three rows, to form a capacitor array region 100. The capacitor array region 100 couples the preset capacitor cells 102 as a whole through a conductive layer 101.

A conductor layer 104 is connected to a bottom electrode of the preset capacitor cell 102, to simulate the capacitor array region 100 as a whole.

It should be noted that, in this embodiment, cell capacitors distributed in a matrix constitute a preset capacitor cell, and preset capacitor cells distributed in a matrix constitute a capacitor array region. This is merely an introduction to an implementation of the capacitor array region and the preset capacitor cell, and does not constitute a limitation on the capacitor array region and the preset capacitor cell. In a specific application, the cell capacitors and the preset capacitor cells may alternatively be distributed in other manners.

The local simulation model may be built in the following manner:

S510. Build a cell simulation model of the preset capacitor cell.

S520. Obtain a capacitor simulation model of the capacitor array region based on an arrangement manner of the preset capacitor cells in the capacitor array region, and the cell simulation model of each preset capacitor cell.

S530. Obtain arrangement directions of the preset capacitor cells based on the arrangement manner of the preset capacitor cells, and establish a parasitic resistance equivalent test structure for a group of preset capacitor cells in a same arrangement direction.

S540. Determine a parasitic resistance of each preset capacitor cell based on the parasitic resistance equivalent test structure.

S550. Build the local simulation model based on the capacitor simulation model and the parasitic resistance of each preset capacitor cell.

In step S510, a theoretical capacitance of the preset capacitor cell is denoted as a first theoretical capacitance, and a theoretical capacitance of the cell capacitor is denoted as a second theoretical capacitance. The cell simulation model is configured to represent the first theoretical capacitance of the preset capacitor cell. The cell simulation model may be built based on a quantity of cell capacitors in the preset capacitor cell and a second theoretical capacitance of each cell capacitor.

Example 2

Referring to FIG. 1C, cell capacitors 203 are distributed in a matrix, and are specifically distributed in a matrix array of three columns and three rows, to form a preset capacitor cell 202. The preset capacitor cell 202 couples the cell capacitors 203 as a whole through a conductive layer 201. The capacitor array region 200 includes two preset capacitor cells, respectively denoted as a first preset capacitor cell 202a and a second preset capacitor cell 202b. The capacitor array region 200 couples the first preset capacitor cell 202a and the second preset capacitor cell 202b as a whole through the conductive layer 201. A conductor layer 204 is connected to a bottom electrode of the preset capacitor cell, to simulate the capacitor array region 200 as a whole capacitor.

In this example, one preset capacitor cell (such as the first preset capacitor cell 202a or the second preset capacitor cell 202b) includes nine cell capacitors 203. Second theoretical capacitances of the nine cell capacitors 203 are the same. The cell simulation model is configured to represent a first theoretical capacitance of one preset capacitor cell. The first theoretical capacitance is nine times the second theoretical capacitance of the cell capacitor 203.

It should be noted that, in other examples, if capacitance values of the nine cell capacitors are different, the cell simulation model is configured to represent that a capacitance value of one preset capacitor cell is a sum of the second theoretical capacitances of the nine cell capacitors.

In step S520, the capacitor simulation model is configured to represent the first theoretical capacitance of each preset capacitor cell and the arrangement manner of the preset capacitor cells in the capacitor array region.

In this step, a connection relationship of the preset capacitor cells can be obtained according to the arrangement manner of the preset capacitor cells in the capacitor array region, and the capacitor simulation model of the capacitor array region is obtained based on a connection relationship of the preset capacitor cells, and the cell simulation model of the preset capacitor cell.

Example 3

Referring to FIG. 1C and FIG. 1D, a capacitor array region in the example 3 is the same as the capacitor array region in the example 2, and details are not described again.

In this example, as defined, an arrangement direction of the preset capacitor cells is a direction X, and a direction Y is perpendicular to the arrangement direction of the preset capacitor cells. Cell simulation models of two preset capacitor cells are connected in series to form a capacitor simulation model of the capacitor array region 200. The capacitor simulation model includes a first equivalent capacitor Cap1 and a second equivalent capacitor Cap2. The first equivalent capacitor Cap1 is configured to represent a theoretical capacitance of the first preset capacitor cell 202a. The second equivalent capacitor Cap2 is configured to represent a theoretical capacitance of the second preset capacitor cell 202b.

It should be noted that, in other embodiments, if the capacitor array region includes preset capacitor cells arranged in a plurality of rows or columns, the arrangement direction (that is, determine the direction X and the direction Y) of the preset capacitors needs to be determined according to a direction in which conductor layers are connected. In the direction X, the cell simulation models of the preset capacitor cells are coupled in series. In the direction Y, the simulation models of the preset capacitor cells are coupled in parallel.

In addition, it should be additionally noted that, the capacitor array region formed by two preset capacitor cells is merely an example for building a capacitor simulation model in this example, and does not constitute a limitation to this embodiment. In other examples, the capacitor simulation model may be built according to a quantity of preset capacitor cells in an actual capacitor array region.

In step S530, after the arrangement manner of the preset capacitor cells is determined, the arrangement directions of the preset capacitor cells may be determined based on the arrangement manner. Then, a parasitic resistance equivalent test structure may be established for a group of preset capacitor cells in a same arrangement direction, such that the parasitic resistance of the preset capacitor cell can be determined more accurately.

The establishing a parasitic resistance equivalent test structure for a group of preset capacitor cells in a same arrangement direction includes:

S531. Establish a conductor layer, wherein the conductor layer is coupled to a bottom electrode of the preset capacitor cell.

S532. Establish a conductive layer, wherein the preset capacitor cell is provided in the conductive layer, and the conductive layer couples top electrodes of the group of preset capacitor cells in the same arrangement direction in series with each other.

S533. Establish the parasitic resistance equivalent test structure based on the conductor layer and the conductive layer by using a conductor layer of each preset capacitor cell in the group of preset capacitor cells as an endpoint.

Example 4

Referring to FIG. 1C and FIG. 1E, a capacitor array region in the example 4 is the same as the capacitor array region in the example 2, and details are not described again.

In this example, the conductor layer 204 may be coupled to a bottom electrode 206 of the preset capacitor cell 202 through a bottom conductive layer 207. The bottom conductive layer 207 is a capacitive contact pad (landing pad) structure used in a memory structure to change an arrangement manner of cell capacitors 203.

The preset capacitor cell 202 is provided in the conductive layer 201, and the conductive layer 201 couples top electrodes 205 of the group of preset capacitor cells 202 in the same arrangement direction in series with each other.

It should be noted that there may also be a capacitive dielectric layer between the electrode 205 and the bottom electrode 206. However, the capacitive dielectric layer is irrelevant to the patent content of this example, and therefore is not shown in the accompanying drawings.

The parasitic resistance equivalent test structure is determined based on the conductive layer 201 and the conductor layer 204 by using a conductor layer 204 of each preset capacitor cell 202 in the group of preset capacitor cells as an endpoint.

In step S540, one of the preset capacitor cells is selected from the capacitor array region as a target preset capacitor cell, and an equivalent conductive layer of the preset capacitor cell is defined by using a preset interface of a conductive layer on which an adjacent preset capacitor is located as a separation interface (as shown by a dashed line in FIG. 1B).

It should be noted that, if a quantity of a group of preset capacitor cells in the arrangement direction is greater than or equal to 3, except for two preset capacitor cells at edges, the remaining preset capacitor cells define equivalent conductive layers through separation interfaces on two sides. For equivalent conductive layers located on both sides at the edge, the equivalent conductive layer is defined by the separation interface located on one side and an edge of the conductive layer.

In this step, the preset interface is a midline interface of a conductive layer at which the adjacent preset capacitor is located. The midline interface of the conductive layer is used as the preset interface, such that an obtained parasitic resistance of the preset capacitor cell is more accurate.

Example 5

Referring to FIG. 1C and FIG. 1F, a capacitor array region in the example 5 is the same as the capacitor array region in the example 2, and details are not described again.

In this example, that the first preset capacitor cell 202a on the left side is a target preset capacitor cell is used as an example for specific description.

Based on the arrangement direction of the first preset capacitor cell 202a and the second preset capacitor cell 202b, that is, based on the direction X, a minimum distance between a boundary of the target preset capacitor cell and a boundary of an equivalent conductive layer in which the target preset capacitor cell is located is obtained.

In the arrangement direction (that is, the direction X) of the preset capacitor cells, a minimum distance b on a first side and a minimum distance f on a second side from the boundary of the target preset capacitor cell to a separation boundary are obtained. The minimum distance b on the first side is close to an endpoint A on a left side. The minimum distance on the second side is far away from the endpoint A on the left side. In this example, because the capacitor array region 200 formed by two preset capacitor cells is used as an example for specific description, the target preset capacitor cell does not have a separation boundary on a side close to the endpoint A, but a boundary of the equivalent conductive layer. In this case, the boundary of the equivalent a conductive layer is used as the separation boundary to obtain the minimum distance b on the first side.

Based on an arrangement direction perpendicular to the preset capacitor cell, that is, based on the direction Y, a minimum distance between a boundary of the target preset capacitor cell and a boundary of the equivalent conductive layer is obtained.

In the arrangement direction perpendicular to the preset capacitor cell, a first minimum distance a between an upper boundary of the target preset capacitor cell and an upper boundary of the equivalent conductive layer is obtained, and a second minimum distance c between a lower boundary of the target preset capacitor cell and a lower boundary of the equivalent conductive layer is obtained.

In the arrangement direction of the preset capacitor cells and the arrangement direction perpendicular to the preset capacitor cell, characteristic quantities of capacitor cells in the target preset capacitor cell are obtained. The characteristic quantities include a quantity of the capacitor cells, a distance between the capacitor cells, and a line width of the capacitor cells.

Referring to FIG. 1F, the characteristic quantities include nc, L-nc, nr, L-nr, d, and e. nc is a quantity of cell capacitors 203 in the direction X, L-nc is a line width of the cell capacitors 203 in the direction X, and d is a distance between the cell capacitors 203 in the direction X. nr is a quantity of cell capacitors 203 in the direction Y, L-nr is a line width of the cell capacitors 203 in the direction Y, and e is a distance between the cell capacitors 203 in the direction Y.

Based on the minimum distance and the characteristic quantities, the obtaining the parasitic resistance of the target preset capacitor cell may include:

The parasitic resistance of the target preset capacitor cell is determined based on the following formula:

$$R=Rtcp*(L-nc*nc/2+b/2+f-d)/(L-nr*nr+a+c-e);$$

wherein R is the parasitic resistance, and Rtcp is resistivity of the equivalent conductive layer, that is, a circuit rate of the conductive layer 201; b is the minimum distance on the first side, and f is the minimum distance on the second side; nc is the quantity of cell capacitors in the direction X, L-nc is the line width of the cell capacitors 203 in the direction X, and d is the distance between the cell capacitors 203 in the direction X; nr is the quantity of cell capacitors 203 in the direction Y, L-nr is the line width of the cell capacitors 203 in the direction Y, and e is the distance between the cell capacitors 203 in the direction; and a and c are each a minimum distance between the boundary of the target preset capacitor cell and the boundary of the capacitor array region 111 in the direction Y.

Based on the minimum distances and the characteristics quantities defined in the direction X and the direction Y, the formula for obtaining the parasitic capacitance R is applicable to the capacitor array region 111 in any arrangement manner. In the capacitor array region 111 in any arrangement manner, because there are at least two conductor layers, the parasitic resistance equivalent test structure is determined by using the conductor layer, thus determining the direction X (refer to FIG. 1B, FIG. 1C, and FIG. 1F) and the direction Y (refer to FIG. 1B, FIG. 1C, and FIG. 1F), which ensures that there is only one direction X and only one direction Y in the capacitor array region, thereby ensuring applicability of the formula for determining the parasitic capacitance R.

The foregoing steps are repeated, to obtain the parasitic resistance of each preset capacitor cell in the capacitor array region.

In step S550, the local simulation model may be built by coupling an equivalent capacitor of each preset capacitor cell in the capacitor simulation model in series with a corresponding parasitic resistor.

The equivalent capacitor is configured to represent the first theoretical capacitance of the preset capacitor cell corresponding to the equivalent capacitor.

Example 6

Referring to FIG. 1C, FIG. 1G, and FIG. 1H, a capacitor array region in the example 6 is the same as the capacitor array region in the example 2, and details are not described again.

In this example, the capacitor simulation model includes a first equivalent capacitor Cap1 and a second equivalent capacitor Cap2. A first parasitic resistor R1 is a parasitic resistor determined by the first preset capacitor cell 202a according to step S540. A second parasitic resistor R2 is a parasitic resistor determined by the second preset capacitor cell 202b according to step S540.

The first equivalent capacitor Cap1 is coupled in series with the first parasitic resistor R1, and the second equivalent capacitor Cap2 is coupled in series with the second parasitic resistor R2, to form an initial simulation model. Referring to FIG. 1G, the initial simulation model includes the first equivalent capacitor Cap1, the first parasitic resistor R1, the second equivalent capacitor Cap2, and the second parasitic resistor R2.

The, the first equivalent capacitor Cap1, the first parasitic resistor R1, the second equivalent capacitor Cap2, and the second parasitic resistor R2 in the initial simulation model are equated into one equivalent capacitor, which is denoted as a third equivalent capacitor Cap3, to form a final local simulation model. That is, referring to FIG. 1H, the local simulation model includes the third equivalent capacitor Cap3. The local simulation model is built based on the equivalent capacitor of each preset capacitor cell coupled in series with the parasitic resistor in the capacitor simulation model. In the local simulation model, an impact of the parasitic resistor of the preset capacitor cell on performance of the formed memory structure is considered, thereby improving accuracy and reliability of a simulation result of the memory structure.

In this simulation method, an accurate local simulation model and an accurate local parameter netlist can be obtained. Then, the overall parameter netlist of the peripheral region is created based on the foregoing accurate local simulation model and local parameter netlist, so as to improve accuracy and reliability of the simulation result. In addition, during the creation of the local parameter netlist, the parasitic parameter extraction program does not need to perform a verification step for the capacitor array region, which can increase a speed for extracting the parasitic parameter, thereby increasing a speed for creating the local parameter netlist and increasing a speed of the entire simulation. In other words, the simulation method enables efficient and reliable simulation.

The present disclosure further provides a simulation apparatus, applied to a peripheral region of a memory structure. The peripheral region includes a capacitor array region and a non-capacitor array region. The simulation apparatus is configured to implement the foregoing simulation method, to improve efficiency and reliability of the simulation of the memory structure.

Figure 2:
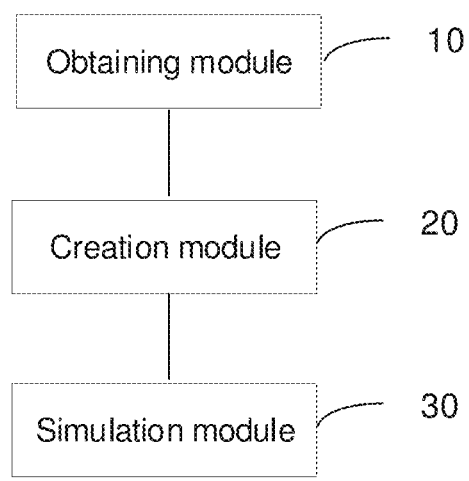
FIG. 2 is a block diagram of a simulation apparatus according to an exemplary embodiment.

In an exemplary embodiment, a simulation apparatus is provided. Referring to FIG. 2, the simulation apparatus may include an obtaining module 10, a creation module 20, and a simulation module 30. In the process of implementing the foregoing simulation method by the simulation apparatus, the obtaining module 10 is configured to obtain a pre-built local simulation model of the capacitor array region, wherein the local simulation model is configured to represent first simulation parameters of the capacitor array region;

the creation module 20 is configured to create a local parameter netlist of the non-capacitor array region, wherein the local parameter netlist includes second simulation parameters of the non-capacitor array region; and further configured to create an overall parameter netlist of the peripheral region based on the local simulation model and the local parameter netlist, wherein the overall parameter netlist represents overall simulation parameters of the peripheral region, and the overall simulation parameters include the first simulation parameters and the second simulation parameters; and the simulation module 30 is configured to perform simulation on the peripheral region based on the overall parameter netlist.

The first simulation parameters may include a first theoretical parameter and a first parasitic parameter of the capacitor array region. The second simulation parameters may include a second theoretical parameter and a second parasitic parameter of the non-capacitor array region.

In an exemplary embodiment, a simulation apparatus is provided. Referring to FIG. 2, in the simulation apparatus, the creation module 20 is specifically configured to:

construct a local theoretical parameter netlist of the non-capacitor array region, wherein the local theoretical parameter netlist includes the second theoretical parameter;

extract a second parasitic parameter of the peripheral region based on a parasitic parameter extraction program, and create a local parasitic parameter netlist; and create the local parameter netlist based on the local theoretical parameter netlist and the local parasitic parameter netlist.

In an exemplary embodiment, a simulation apparatus is provided. Referring to FIG. 2, in the simulation apparatus, the creation module 20 is further configured to:

during the extraction of the second parasitic parameter, skip a preset step in the parasitic parameter extraction program, wherein the preset step is a verification step for the capacitor array region.

In an exemplary embodiment, a simulation apparatus is provided. In the simulation apparatus, the capacitor array region includes a plurality of preset capacitor cells, the preset capacitor cells each include a plurality of cell capacitors, the first theoretical parameter includes a first theoretical capacitance of each preset capacitor cell, and the first parasitic parameter includes a parasitic resistance of each preset capacitor cell.

In an exemplary embodiment, a simulation apparatus is provided. In the simulation apparatus, the local simulation model includes a first port related to the capacitor array region and a second port related to the non-capacitor array region, and the local parameter netlist includes a third port related to the capacitor array region and a fourth port related to the non-capacitor array region.

Referring to FIG. 2, the creation module 20 is further configured to:

create the overall parameter netlist by calling the first port, the second port, the third port, and the fourth port.

Figure 3:
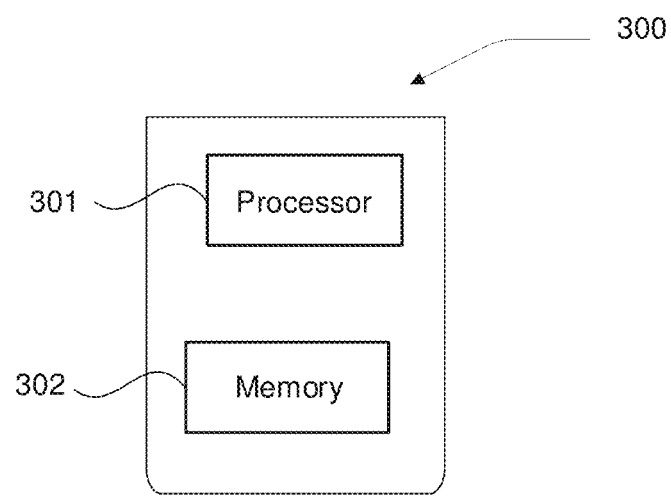
FIG. 3 is a block diagram of a simulation device according to an exemplary embodiment.

In an exemplary embodiment, a simulation device is further provided, and applied to a peripheral region of a memory structure, and the peripheral region includes a capacitor array region and a non-capacitor array region. Referring to FIG. 3, the simulation device 300 may be provided as a server. The simulation device 300 may include a processor 301. A quantity of processors may be set to one or more as needed. The simulation device 300 may further include a memory 302, configured to store instructions executable by the processor 301, such as an application program. One or more memories may be set as required. The memory may store one or more application programs. The processor 301 is configured to execute the instruction to perform the foregoing memory test method.

For example, the processor 301 is configured to:

obtaining a pre-built local simulation model of the capacitor array region, wherein the local simulation model is configured to represent first simulation parameters of the capacitor array region;

creating a local parameter netlist of the non-capacitor array region, wherein the local parameter netlist includes second simulation parameters of the non-capacitor array region;

creating an overall parameter netlist of the peripheral region based on the local simulation model and the local parameter netlist, wherein the overall parameter netlist represents overall simulation parameters of the peripheral region, and the overall simulation parameters include the first simulation parameters and the second simulation parameters; and performing simulation on the peripheral region based on the overall parameter netlist.

In an exemplary embodiment, a non-transitory computer-readable storage medium is further provided. Referring to FIG. 3, for example, the non-transitory computer-readable storage medium may be the memory 302 including instructions. When executed by the processor 301 of the simulation device 300 described above, instructions in the storage medium enable the simulation device 300 to perform the simulation method described above.

For example, when executed by the processor of the simulation device described above, the instructions in the storage medium enable the simulation device to perform the following steps:

obtaining a pre-built local simulation model of the capacitor array region, wherein the local simulation model is configured to represent first simulation parameters of the capacitor array region;

creating a local parameter netlist of the non-capacitor array region, wherein the local parameter netlist includes second simulation parameters of the non-capacitor array region;

creating an overall parameter netlist of the peripheral region based on the local simulation model and the local parameter netlist, wherein the overall parameter netlist represents overall simulation parameters of the peripheral region, and the overall simulation parameters include the first simulation parameters and the second simulation parameters; and performing simulation on the peripheral region based on the overall parameter netlist.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media that include computer-usable program code. The computer storage media include volatile and non-volatile, removable and non-removable media implemented in any method or technology for storing information (such as computer-readable instructions, data structures, program modules, or other data), including but not limited to, a random access memory (RAM), a read-only memory (ROM), an electrically erasable programmable read-only memory (EEPROM), a flash memory or other storage technologies, a compact disc read-only memory (CD-ROM), a digital versatile disk (DVD) or other optical disc storage, a magnetic cassette, a magnetic tape, magnetic disk storage or other magnetic storage apparatuses, or any other medium that can be used to store desired information and can be accessed by a computer. In addition, as is well known to persons of ordinary skill in the art, the communication media usually contain computer-readable instructions, data structures, program modules, or other data in modulated data signals such as carrier waves or other transmission mechanisms, and may include any information transfer medium.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or another programmable device, thereby generating computer-implemented processing. Therefore, the instructions executed on the computer or the another programmable device provide steps for implementing a specific function in one or more processes in the flowcharts and/or in one or more blocks in the block diagrams.

In the specification, the terms "include", "comprise", or any other variations thereof are intended to cover a non-exclusive inclusion, so that an article or a device including a series of elements not only includes those elements, but also includes other elements that are not explicitly listed, or also includes inherent elements of the article or the device. Without more restrictions, the elements defined by the statement "including a . . . " do not exclude the existence of other identical elements in the article or device including the elements.

Although some preferred embodiments of the present disclosure have been described, persons skilled in the art can make changes and modifications to these embodiments once they learn the basic inventive concept. Therefore, the appended claims are intended to be interpreted as including the preferred embodiments and all changes and modifications falling within the scope of the present disclosure.

Apparently, persons skilled in the art can make various changes and modifications to the present disclosure without departing from the spirit and scope of the present disclosure. In this way, if these changes and modifications to the present disclosure fall within the scope of the claims of the present disclosure and equivalent technologies thereof, the present disclosure is further intended to include these changes and modifications.

INDUSTRIAL APPLICABILITY

According to the simulation method, apparatus, and device, and the storage medium provided in the embodiments of the present disclosure, there is no need to create a parameter netlist of a capacitor array region and there is no need to extract a parasitic parameter of the capacitor array region, such that a duration for creating an overall parameter netlist can be reduced, and thus a duration of the entire simulation process is reduced, thereby improving simulation efficiency. In addition, because the layout of the capacitor array region is generally relatively regular, it is also easy to build a local simulation model in advance, and reliability of the local simulation model is also favorable. Accuracy of a finally obtained overall parameter netlist is also high, and a simulation effect is favorable.

The invention claimed is:

1. A simulation method, applied to a peripheral region of a memory structure, wherein the peripheral region comprises a capacitor array region and a non-capacitor array region, and the simulation method comprises:

obtaining a pre-built local simulation model of the capacitor array region, wherein the local simulation model is configured to represent first simulation parameters of the capacitor array region;

creating a local parameter netlist of the non-capacitor array region, wherein the local parameter netlist comprises second simulation parameters of the non-capacitor array region;

creating an overall parameter netlist of the peripheral region based on the local simulation model and the local parameter netlist, wherein the overall parameter netlist represents overall simulation parameters of the peripheral region, and the overall simulation parameters comprise the first simulation parameters and the second simulation parameters; and performing simulation on the peripheral region based on the overall parameter netlist.

2. The simulation method according to claim 1, wherein the first simulation parameters comprise a first theoretical parameter and a first parasitic parameter of the capacitor array region; or the second simulation parameters comprise a second theoretical parameter and a second parasitic parameter of the non-capacitor array region; or the first simulation parameters comprise a first theoretical parameter and a first parasitic parameter of the capacitor array region, and the second simulation parameters comprise a second theoretical parameter and a second parasitic parameter of the non-capacitor array region.

3. The simulation method according to claim 2, wherein the creating a local parameter netlist of the non-capacitor array region comprises:

constructing a local theoretical parameter netlist, wherein the local theoretical parameter netlist comprises the second theoretical parameter;

extracting a second parasitic parameter of the peripheral region based on a parasitic parameter extraction program, and creating a local parasitic parameter netlist; and creating the local parameter netlist based on the local theoretical parameter netlist and the local parasitic parameter netlist.

4. The simulation method according to claim 3, wherein the extracting a second parasitic parameter of the peripheral region based on a parasitic parameter extraction program, and creating a local parasitic parameter netlist comprises:

during the extraction of the second parasitic parameter, skipping a preset step in the parasitic parameter extraction program, wherein the preset step is a verification step for the capacitor array region.

5. The simulation method according to claim 2, wherein the capacitor array region comprises a plurality of preset capacitor cells, the preset capacitor cells each comprise a plurality of cell capacitors, the first theoretical parameter comprises a first theoretical capacitance of each preset capacitor cell, and the first parasitic parameter comprises a parasitic resistance of each preset capacitor cell.

6. The simulation method according to claim 5, wherein the local simulation model is built in the following manner:

building a cell simulation model of the preset capacitor cell, wherein the cell simulation model is configured to represent a first theoretical capacitance of the preset capacitor cell;

obtaining a capacitor simulation model of the capacitor array region based on an arrangement manner of the preset capacitor cells in the capacitor array region, and the cell simulation model of each preset capacitor cell, wherein the capacitor simulation model is configured to represent the first theoretical capacitance of each preset capacitor cell and the arrangement manner of the preset capacitor cells in the capacitor array region;

obtaining arrangement directions of the preset capacitor cells based on the arrangement manner of the preset capacitor cells, and establishing a parasitic resistance equivalent test structure for a group of preset capacitor cells in a same arrangement direction;

determining the parasitic resistance of each preset capacitor cell based on the parasitic resistance equivalent test structure; and building the local simulation model based on the capacitor simulation model and the parasitic resistance of each preset capacitor cell.

7. The simulation method according to claim 6, wherein the establishing a parasitic resistance equivalent test structure for a group of preset capacitor cells in a same arrangement direction comprises:

establishing a conductor layer, wherein the conductor layer is coupled to a bottom electrode of the preset capacitor cell;

establishing a conductive layer, wherein the preset capacitor cell is provided in the conductive layer, and the conductive layer couples top electrodes of the group of preset capacitor cells in the same arrangement direction in series with each other; and establishing the parasitic resistance equivalent test structure based on the conductor layer and the conductive layer by using a conductor layer of each preset capacitor cell in the group of preset capacitor cells as an endpoint.

8. The simulation method according to claim 6, wherein the building the local simulation model based on the capacitor simulation model and the parasitic resistance of each preset capacitor cell comprises:

building the local simulation model by coupling an equivalent capacitor of each preset capacitor cell in the capacitor simulation model in series with a corresponding parasitic resistor, wherein the equivalent capacitor is configured to represent the first theoretical capacitance of the preset capacitor cell corresponding to the equivalent capacitor.

9. The simulation method according to claim 1, wherein the local simulation model comprises a first port related to the capacitor array region and a second port related to the non-capacitor array region, and the local parameter netlist comprises a third port related to the capacitor array region and a fourth port related to the non-capacitor array region; and the creating an overall parameter netlist of the peripheral region based on the local simulation model and the local parameter netlist comprises:

creating the overall parameter netlist by calling the first port, the second port, the third port, and the fourth port.

10. A non-transitory computer-readable storage medium, wherein when executed by a processor of a simulation device, instructions in the non-transitory computer-readable storage medium enable the simulation device to perform the simulation method according to claim 1.

11. A simulation device, applied to a peripheral region of a memory structure, wherein the peripheral region comprises a capacitor array region and a non-capacitor array region, and the simulation device comprises:

a processor; and a memory, configured to store instructions executable by the processor, wherein the processor is configured to perform a simulation method, and the simulation method comprises:

obtaining a pre-built local simulation model of the capacitor array region, wherein the local simulation model is configured to represent first simulation parameters of the capacitor array region;

creating a local parameter netlist of the non-capacitor array region, wherein the local parameter netlist comprises second simulation parameters of the non-capacitor array region;

creating an overall parameter netlist of the peripheral region based on the local simulation model and the local parameter netlist, wherein the overall parameter netlist represents overall simulation parameters of the peripheral region, and the overall simulation parameters comprise the first simulation parameters and the second simulation parameters; and performing simulation on the peripheral region based on the overall parameter netlist.

12. The simulation device according to claim 11, wherein the first simulation parameters comprise a first theoretical parameter and a first parasitic parameter of the capacitor array region; or the second simulation parameters comprise a second theoretical parameter and a second parasitic parameter of the non-capacitor array region; or the first simulation parameters comprise a first theoretical parameter and a first parasitic parameter of the capacitor array region, and the second simulation parameters comprise a second theoretical parameter and a second parasitic parameter of the non-capacitor array region.

13. The simulation device according to claim 12, wherein the creating a local parameter netlist of the non-capacitor array region comprises:

constructing a local theoretical parameter netlist of the non-capacitor array region, wherein the local theoretical parameter netlist comprises the second theoretical parameter;

extracting a second parasitic parameter of the peripheral region based on a parasitic parameter extraction program, and creating a local parasitic parameter netlist; and creating the local parameter netlist based on the local theoretical parameter netlist and the local parasitic parameter netlist.

14. The simulation device according to claim 13, wherein the extracting a second parasitic parameter of the peripheral region based on a parasitic parameter extraction program, and creating a local parasitic parameter netlist comprises:

during the extraction of the second parasitic parameter, skipping a preset step in the parasitic parameter extraction program, wherein the preset step is a verification step for the capacitor array region.

15. The simulation device according to claim 12, wherein the capacitor array region comprises a plurality of preset capacitor cells, the preset capacitor cells each comprise a plurality of cell capacitors, the first theoretical parameter comprises a first theoretical capacitance of each preset capacitor cell, and the first parasitic parameter comprises a parasitic resistance of each preset capacitor cell.

16. The simulation device according to claim 11, wherein the local simulation model comprises a first port related to the capacitor array region and a second port related to the non-capacitor array region, and the local parameter netlist comprises a third port related to the capacitor array region and a fourth port related to the non-capacitor array region; and the creating an overall parameter netlist of the peripheral region based on the local simulation model and the local parameter netlist comprises:

creating the overall parameter netlist by calling the first port, the second port, the third port, and the fourth port.

* * * * *